(12) United States Patent
Obata et al.

(10) Patent No.: US 8,681,293 B2
(45) Date of Patent: Mar. 25, 2014

(54) LIQUID CRYSTAL DISPLAY DEVICE

(75) Inventors: Hiroshi Obata, Chiba (JP); Makoto Fujimoto, Chiba (JP); Shunsuke Morishita, Chiba (JP); Naruhiro Matsumoto, Chiba (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 27 days.

(21) Appl. No.: 13/612,058

(22) Filed: Sep. 12, 2012

(65) Prior Publication Data

US 2013/0083270 A1 Apr. 4, 2013

(30) Foreign Application Priority Data

Sep. 29, 2011 (JP) ................................. 2011-214001

(51) Int. Cl.
*G02F 1/1335* (2006.01)

(52) U.S. Cl.
USPC ................................. 349/65; 349/62; 349/66

(58) Field of Classification Search
USPC ................................................. 349/62, 65, 66
See application file for complete search history.

(56) References Cited

FOREIGN PATENT DOCUMENTS

JP 2004-213948 7/2004

*Primary Examiner* — Phu Vu
(74) *Attorney, Agent, or Firm* — Hamre, Schumann, Mueller & Larson, P.C.

(57) ABSTRACT

Provided is a liquid crystal display device in which uneven brightness in a side-light type backlight unit is reduced, the uneven brightness being generated through reflection of light from a light source at an interface of an engaging cutout portion for preventing a light guide plate from shifting. A light guide plate (60) includes a cutout portion (82) through which a light guide plate support pin (80) provided upright to a lower frame fitting is inserted, at a lower side adjacent to a left side at which a light bar (64) is arranged. Further, at the lower side, a cutout portion (84) having a shallower recess than that of the cutout portion (82) and positioned in front of the cutout portion (82) when viewed from the light bar (64) is provided.

4 Claims, 4 Drawing Sheets

LIQUID CRYSTAL DISPLAY DEVICE

CROSS-REFERENCE TO RELATED APPLICATION

The present application claims priority from Japanese application JP 2011-214001 filed on Sep. 29, 2011, the content of which is hereby incorporated by reference into this application.

BACKGROUND OF THE INVENTION

1. Field of the Invention

The present invention relates to a side-light type liquid crystal display device.

2. Description of the Related Art

A liquid crystal display device includes a liquid crystal module including a liquid crystal panel and a backlight unit. FIG. 4 is a schematic exploded perspective view of a conventional liquid crystal module 2 including a side-light type backlight unit. A liquid crystal panel 4 serving as a display panel is arranged on a front side of the liquid crystal module 2, and a backlight unit 6 is arranged behind the liquid crystal panel 4. The backlight unit 6 has a laminated structure in which a lower frame fitting 8, a reflective sheet (not shown), a light guide plate 12, an optical sheet 14, and the like are laminated in order from a rear side of the backlight unit 6. A light source 16 is arranged at a lateral surface of the light guide plate 12. The laminated members other than the lower frame fitting 8 are thin plates made of a synthetic resin and the like, and are relatively flexible. The lower frame fitting 8 functions as a support member for supporting a rear side of the laminated members other than the lower frame fitting 8. Further, the lower frame fitting 8 includes a light guide plate support pin 18 which is a protrusion provided upright, for supporting the light guide plate 12. The light guide plate support pin 18 is provided at a position at which an edge of the light guide plate 12 is to be situated. On the other hand, the light guide plate 12 includes, at the above-mentioned position, a cutout portion (engaging concave portion) 20 to which the pin 18 is fitted. Under a state in which the backlight unit 6 is assembled, the light guide plate support pin 18 is inserted through the cutout portion 20, thereby preventing the light guide plate 12 from shifting.

FIG. 5 is a partial plan view schematically illustrating the light guide plate 12, the cutout portion 20, and the light source 16. The light source 16 is arranged so as to cause light to enter an effective display region 22. The cutout portion 20 is provided outside the effective display region 22.

Note that, a protruding portion was formerly provided at an edge of the light guide plate, and the light guide plate was fixed by causing the protruding portion to be caught in a concave portion provided to a mold frame or the like, which surrounded the periphery of the light guide plate. However, in view of attaining a narrower frame, a structure in which the protruding portion is provided to the edge of the light guide plate has a disadvantage. In contrast, a structure in which, as illustrated in FIG. 5, the cutout portion 20 is provided so as to cut inside a side 24 of the light guide plate 12 having a substantially rectangular planar shape has an advantage for attaining a narrower frame.

SUMMARY OF THE INVENTION

On the other hand, there has been a problem in which, because the cutout portion 20 is present near the effective display region 22, the brightness of the effective display region 22 is affected, which may cause uneven brightness in the vicinity of the cutout portion 20. Specifically, the light source 16 is arranged so as to cause light to exclusively enter the effective display region 22 as described above, but the light somewhat expands outside the effective display region as well. Light 30 leaked outside the effective display region may be reflected at a boundary face of the light guide plate 12 formed at the cutout portion 20 to enter inside the effective display region 22, which causes a problem in that the brightness of the effective display region 22 in the vicinity of the cutout portion 20 increases.

The present invention has been made to solve the above-mentioned problem, and has an object to provide a liquid crystal display device capable of reducing an effect to be imparted by a cutout portion on brightness in an effective display region.

According to an exemplary embodiment of the present invention, there is provided a liquid crystal display device, including: a light guide plate having a substantially rectangular planar shape; a light source for emitting illumination light so that the illumination light enters the light guide plate from a lateral surface of the light guide plate; a liquid crystal panel, which is arranged on a front side of the light guide plate and is irradiated with the illumination light guided by the light guide plate; and a support member, which is arranged on a rear side of the light guide plate, for supporting the light guide plate. The support member includes a protrusion directed toward the light guide plate and provided at a position of an adjacent side which is adjacent to, of sides of the substantially rectangular planar shape of the light guide plate, a side at which the light source is arranged. The light guide plate includes: an engaging concave portion, which is a concave portion formed at another lateral surface of the light guide plate on the adjacent side and recessed to an inner side with respect to the adjacent side, for preventing a shift of the light guide plate when the protrusion is inserted therethrough; and a foreset concave portion having a shallower recess than a recess of the engaging concave portion, and positioned in front of the engaging concave portion when viewed from the light source.

According to another exemplary embodiment of the present invention, in the liquid crystal display device, the foreset concave portion comprises a plurality of foreset concave portions arranged in front of the engaging concave portion when viewed from the light source, and the plurality of foreset concave portions have a shallower recess toward the light source side.

According to another exemplary embodiment of the present invention, in the liquid crystal display device, a part of a lateral surface of the light guide plate, which forms the foreset concave portion and into which the illumination light enters, is inclined with respect to an incident direction of the illumination light.

According to another exemplary embodiment of the present invention, in the liquid crystal display device, the foreset concave portion has a width larger than a width of the engaging concave portion.

DETAILED DESCRIPTION OF THE INVENTION

Hereinafter, a mode for carrying out the present invention (hereinafter, referred to as embodiment) is described with reference to the drawings.

Figure 1:
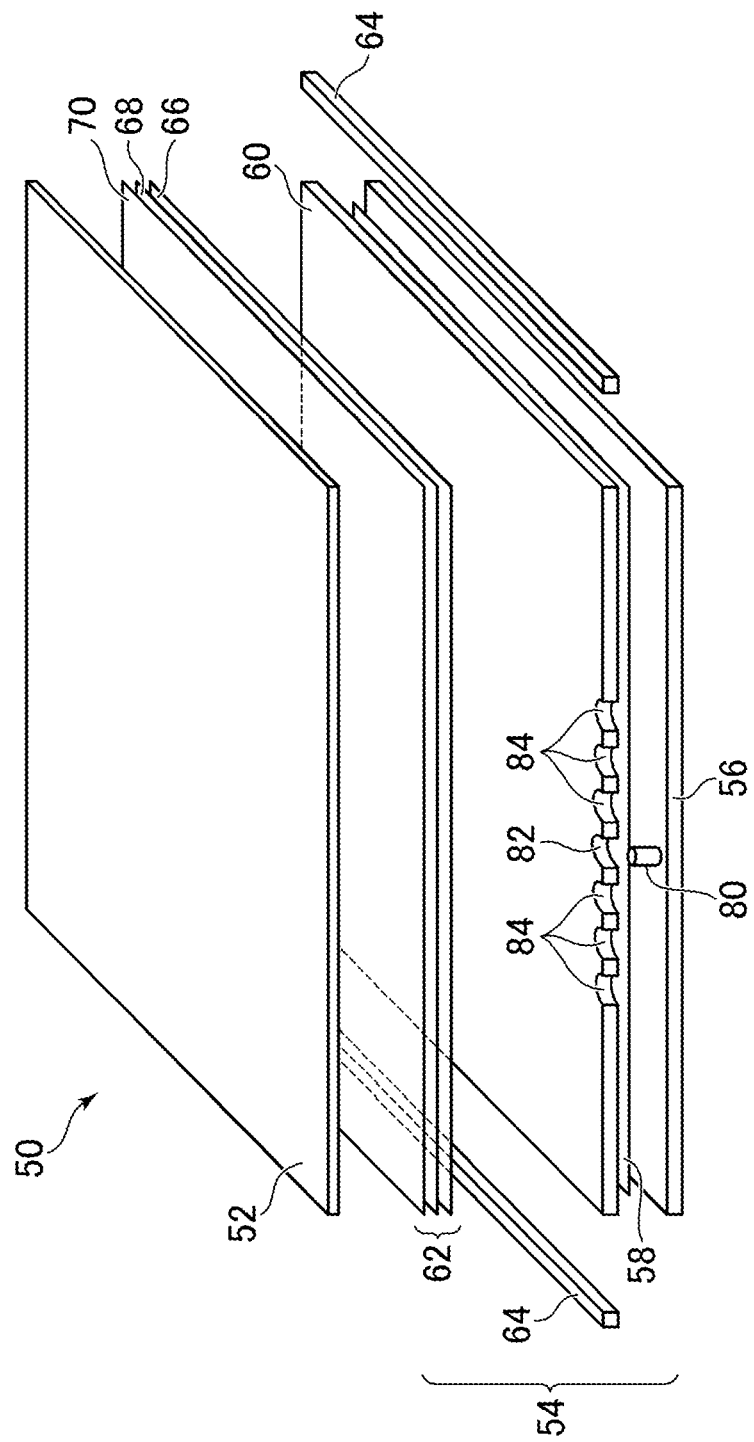
FIG. 1 is a schematic exploded perspective view of a liquid crystal module in a liquid crystal display device according to an embodiment of the present invention.

A liquid crystal display device according to an embodiment of the present invention includes a liquid crystal module including a liquid crystal panel and a backlight unit, and the backlight unit is a side-light type backlight unit. FIG. 1 is a schematic exploded perspective view of a liquid crystal module 50 including the backlight unit in the liquid crystal display device according to the embodiment. A liquid crystal panel 52 serving as a display panel is arranged on a front side of the liquid crystal module 50, and a backlight unit 54 is arranged behind the liquid crystal panel 52.

The backlight unit 54 has a laminated structure in which a lower frame fitting 56, a reflective sheet 58, a light guide plate 60, an optical sheet group 62, and the like are laminated in order from a rear side of the backlight unit 54. A light source is arranged at at least one of upper, lower, right, and left lateral surfaces of the light guide plate 60. In this embodiment, as the light source, light bars 64 are arranged on right and left sides of the light guide plate 60. The light bar 64 is formed so as to include an electronic substrate (not shown) in which light emitting diodes (LEDs) are arranged. The light bar 64 is arranged only at a part of the heightwise dimension of a screen of the light guide plate 60, the part corresponding to an effective display region.

The light guide plate 60 is made of, for example, acrylic. As described above, LED light enters the light guide plate 60 from both right and left lateral surfaces thereof. The light that has entered the light guide plate 60 expands in a planar shape through repetition of total reflection inside the light guide plate 60. The light guide plate 60 is formed so that, due to light transmitted to respective portions of the light guide plate 60, a surface (light emission surface) on the front side thereof uniformly emits light.

The reflective sheet 58 reflects light leaking out from a rear surface of the light guide plate 60 to cause the light to return to the light guide plate 60, thereby enhancing luminous efficiency of the backlight unit 54.

The optical sheet group 62 includes a diffusion sheet 66 and prism sheets 68 and 70. The diffusion sheet 66 is a film which is coated with a resin that diffuses light. The diffusion sheet 66 diffuses light exiting from the front surface of the light guide plate 60, thereby enhancing uniformity of light intensity in an emission plane corresponding to the effective display region.

The prism sheets 68 and 70 are each a film having a streak-like prism extending in one direction or a lens formed on a surface thereof, and each condense light exiting from the diffusion sheet 66 in various forward directions with a direction perpendicular to the surface as a center, thereby increasing the brightness of the emission front surface. The prism sheets 68 and 70 each condense light traveling in a direction orthogonal to the extending direction of the prism and the like. When the two prism sheets 68 and 70 having different light condensing directions are overlapped one on top of another, a two-dimensional light condensing is performed.

The lower frame fitting 56 is positioned on the rear side of the laminated members including the reflective sheet 58, the light guide plate 60, and the optical sheet group 62 to support the laminated members. For example, a peripheral edge portion of the lower frame fitting 56 is bent toward the front side so that the lower frame fitting 56 is formed into a box shape. Inside the lower frame fitting 56, the laminated members and the light bars 64 can be housed. Further, the liquid crystal module 50 is integrally assembled in a manner that a front-side periphery of the lower frame fitting 56 housing the laminated members is pressed by a mold frame or an upper frame fitting (not shown). Further, the mold frame and the upper frame are used to assemble the liquid crystal panel 52 to the liquid crystal module 50.

The lower frame fitting 56 has a function as a support member for supporting a rear surface of the laminated members as described above, and also has a function of fixing the position of the light guide plate 60. In order to fix the position of the light guide plate 60, a light guide plate support pin 80 (protrusion) is provided upright on a surface of the lower frame fitting 56 opposed to the rear surface of the laminated members. In this embodiment, the light guide plate support pin 80 is provided at a position at which, of four sides of a substantially rectangular planar shape of the light guide plate 60, one or both of upper and lower sides, at which the light bar 64 is not arranged, are situated. Further, the light guide plate 60 is provided with a cutout portion 82 (engaging concave portion) to which the light guide plate support pin 80 is fitted, at a position corresponding to the light guide plate support pin 80. For example, in FIG. 1, the light guide plate support pin 80 and the cutout portion 82 are arranged in the vicinity of the center of the lower side of the light guide plate 60. Under a state in which the backlight unit 54 is assembled, the support pin 80 is inserted through the cutout portion 82, thereby preventing the light guide plate 60 from shifting in a right-left direction.

Still further, the light guide plate 60 includes, in addition to the cutout portion 82 through which the light guide plate support pin 80 is inserted, a cutout portion 84 (foreset concave portion) is formed, which is positioned in front of the cutout portion 82 when viewed from the light bar 64.

Figure 2:
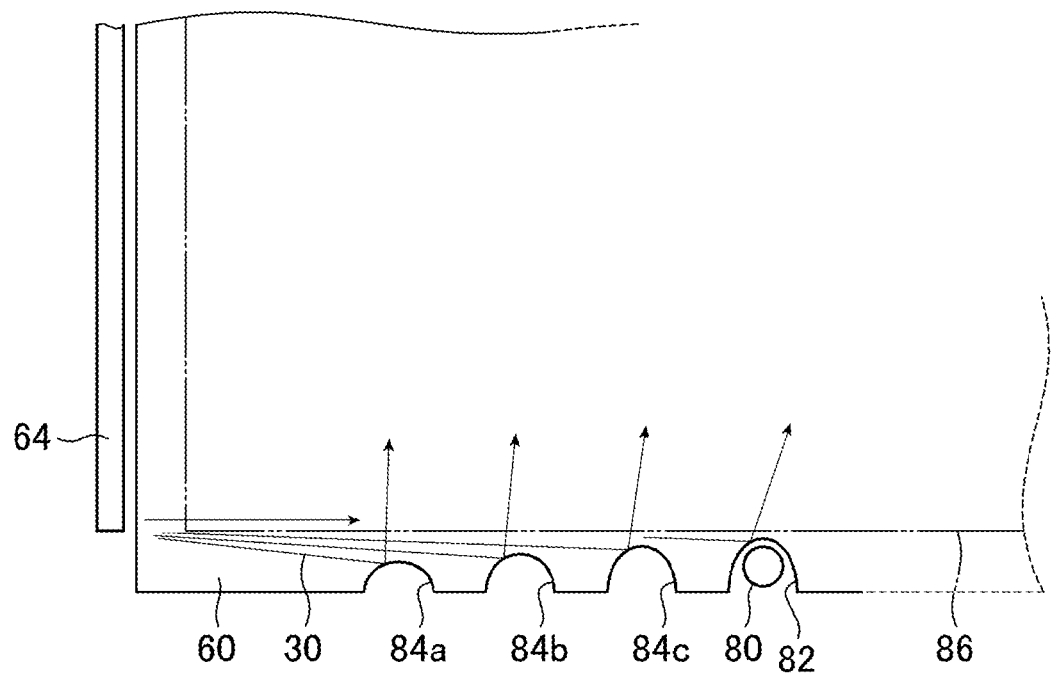
FIG. 2 is a schematic partial plan view of an example of a light guide plate according to the embodiment of the present invention.
Figure 3:
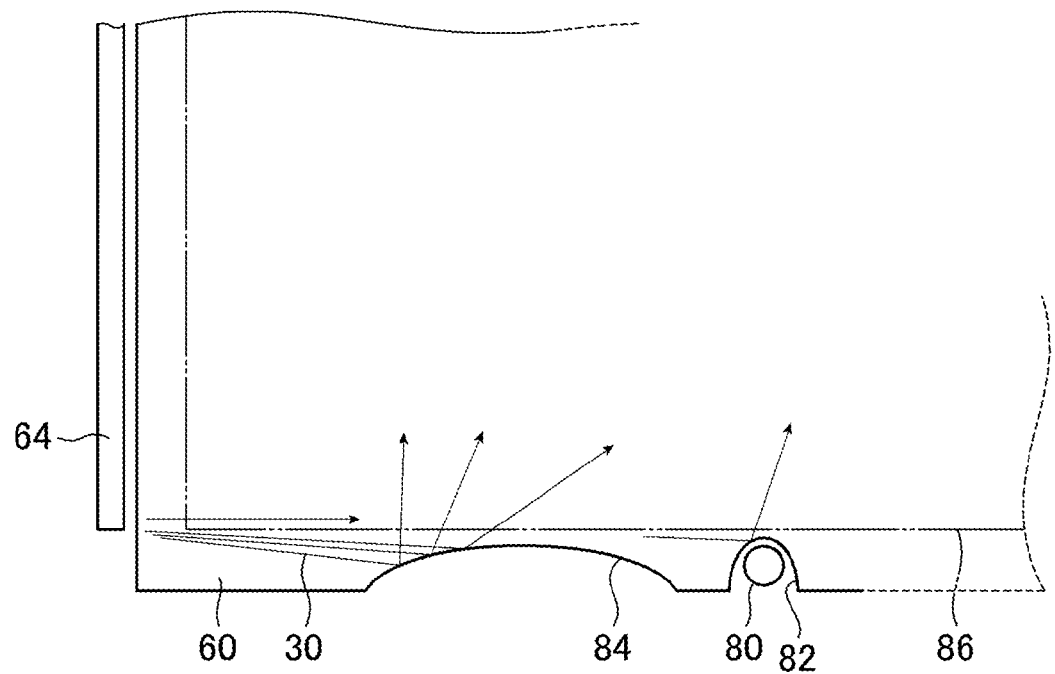
FIG. 3 is a schematic partial plan view of another example of the light guide plate according to the embodiment of the present invention.
Figure 4:
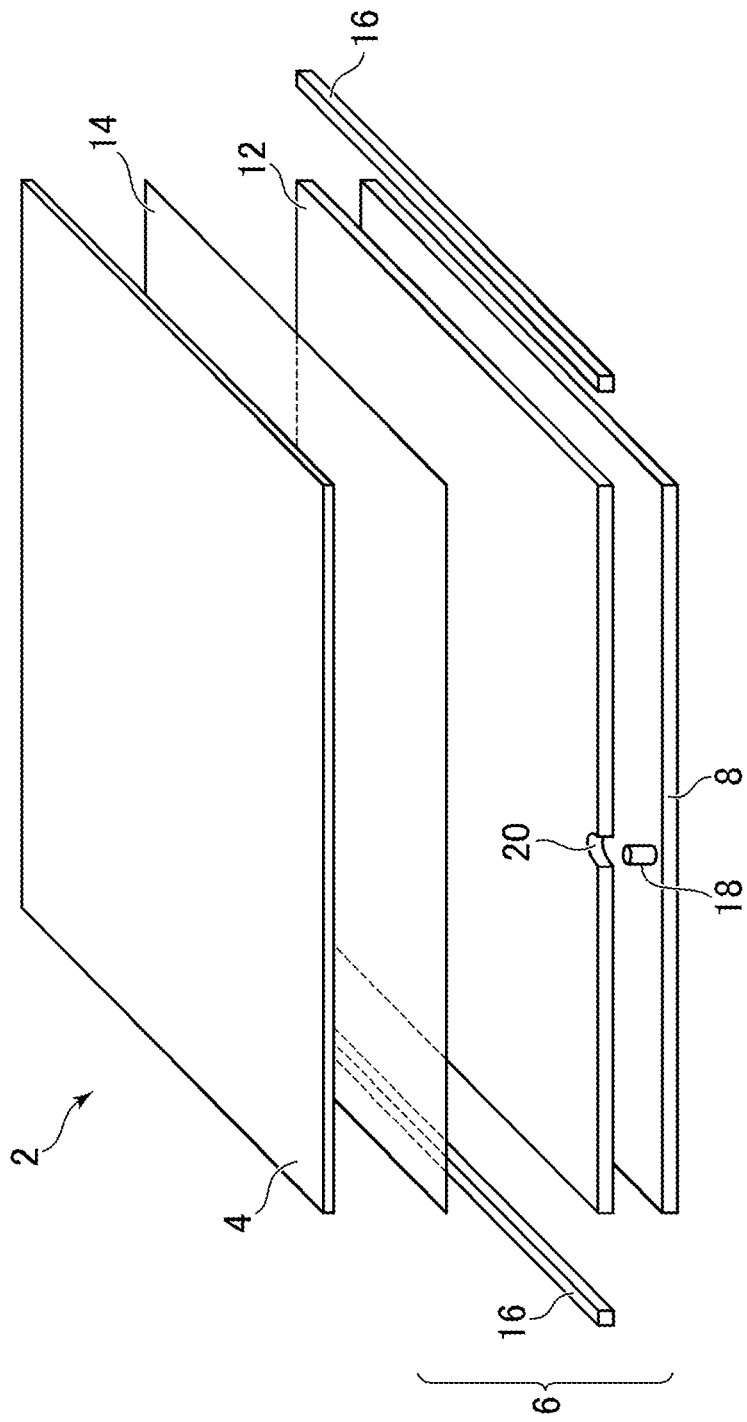
FIG. 4 is a schematic exploded perspective view of a conventional liquid crystal module including a side-light type backlight unit.

FIG. 2 is a schematic partial plan view of the light guide plate 60, for illustrating an example of the cutout portion 84, which corresponds to the structure illustrated in FIG. 1. Further, FIG. 3 is a schematic partial plan view of the light guide plate 60, for illustrating another example of the cutout portion 84. FIGS. 2 and 3 each illustrate only the foreset concave portion provided for the light bar 64 arranged at the left lateral surface of the light guide plate 60, and omit the illustration of the foreset concave portion for the right light bar 64. The upper and lower sides of the four sides of the light guide plate 60 are adjacent sides with respect to the side at which the left light bar 64 is arranged. In this embodiment, the lower side of the adjacent sides includes the cutout portion 82 which is the engaging concave portion. The cutout portion 84 which is the foreset concave portion is formed on the side at which the cutout portion 82 is formed so as to be situated in front of the cutout portion 82 when viewed from the light bar 64.

Figure 5:
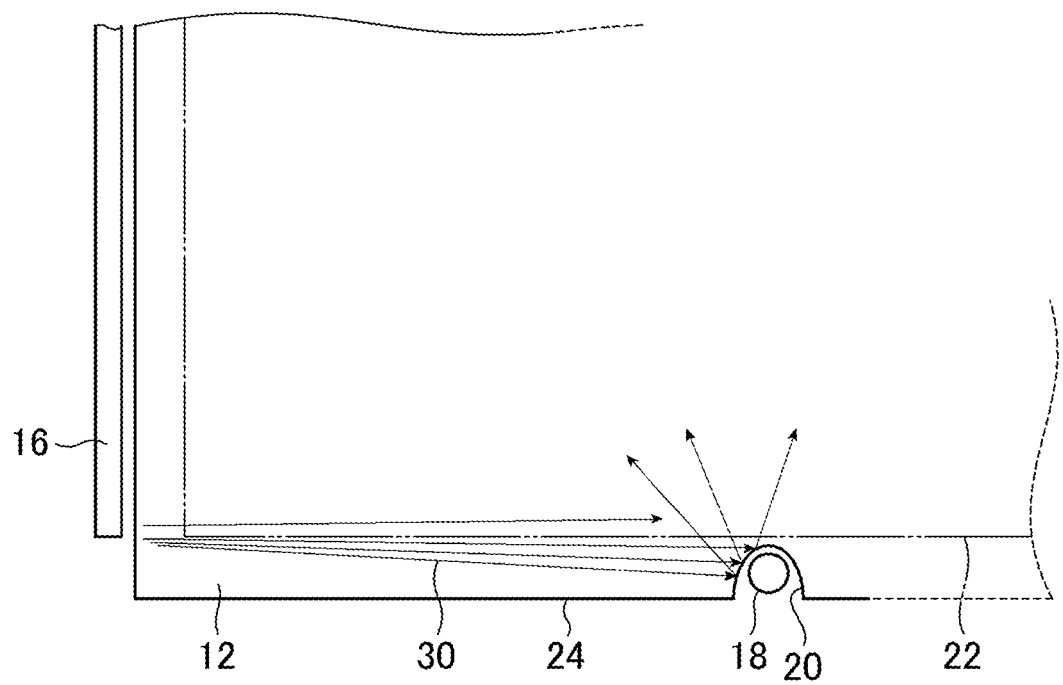
FIG. 5 is a partial plan view schematically illustrating a conventional light guide plate having a cutout portion to be locked by a support pin.

The cutout portion 82 is formed outside an effective display region 86. In a case where the cutout portion 84 is not provided (which corresponds to the case illustrated in FIG. 5), irradiated light 30 from the LED on the lower side of the light bar 64 is liable to collide against the cutout portion 82. In the embodiment of the present invention, part of the irradiated light 30 traveling toward the cutout portion 82 is reflected or absorbed by the cutout portion 84 provided in front of the cutout portion 82. When positions at which the reflection occur are dispersed or the light amount reaching the cutout portion 82 is reduced in this manner, uneven brightness to be caused by the reflection may become inconspicuous. From this viewpoint, the foreset concave portion is formed to have a shallower recess than that of the engaging concave portion, to thereby cause part of the irradiated light from the light source to travel to the engaging concave portion. In this manner, the cutout portion 84 and the cutout portion 82 share the reflection. How much the foreset concave portion is formed shallower than the engaging concave portion is determined in consideration of the positional relationship among the light source, the engaging concave portion, and the foreset concave portion, and how the light emitted from the light source expands, for example.

Further, in order to disperse the reflection, it is preferred that a part of the lateral surface of the light guide plate, which is recessed at the engaging concave portion and the foreset concave portion, and into which the illumination light from the light source enters, be inclined with respect to the incident direction of the illumination light, or be formed into a convex curved surface with respect to the incident light. When the above-mentioned part is inclined, reflection positions can be dispersed, and when the above-mentioned part is formed into a curved surface, reflection directions can be dispersed.

FIG. 2 illustrates an example in which a plurality of the cutout portions 84, which are the foreset concave portions, are arranged. For example, three cutout portions 84a, 84b, and 84c are arranged in the lower side at positions on the light bar 64 side with respect to the cutout portion 82. The three cutout portions 84 are formed shallower than the cutout portion 82 as described above. It is more preferred to form the cutout portions so that the cutout portions have a shallower recess toward the light bar 64 side.

FIG. 3 illustrates an example in which the cutout portion 84 which is the foreset concave portion is formed to have a larger width than the cutout portion 82 which is the engaging concave portion. With the increase of the width, the reflection position at the cutout portion 84 can be extended along the incident direction of the light.

In the above-mentioned embodiment, an example in which the cutout portion 82 is provided at the lower side is described. However, in the above-mentioned structure in which the light bars 64 are arranged at right and left lateral surfaces of the light guide plate 60, the cutout portion 82 may be provided at the upper side. Further, in a structure in which the light bar 64 is arranged at one of the upper and lower sides of the light guide plate 60 or at both of the upper and lower sides, the cutout portion 82 may be arranged at the right and left sides of the light guide plate 60. Also in this case, similar effects can be obtained when the cutout portion 84 is formed in front of the cutout portion 82 when viewed from the light source.

Note that, the foreset concave portion may be filled with a material having a higher refractive index than that of the light guide plate 60, to thereby reduce light to be reflected toward the effective display region from the foreset concave portion.

Further, the protrusion of the lower frame fitting 56, which is to be inserted through the cutout portion 82 of the light guide plate 60, does not need to have a pin shape, and for example, may be a column having a height from the lower frame fitting 56 smaller than a diameter of the column, or may have a planar shape or shapes other than a circle. Further, the protrusion does not need to be provided upright at the bottom surface of the lower frame fitting 56, and for example, may be protruded in a horizontal direction from the lateral surface of the box-shaped lower frame fitting 56.

According to the present invention which has been described by means of the embodiment, the foreset concave portion is provided, and hence the irradiated light from the light source becomes less liable to collide against the engaging concave portion, and the vicinity of the engaging concave portion is prevented from being noticeably bright. Therefore, the uniformity in brightness of the liquid crystal display device is enhanced.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A liquid crystal display device, comprising:
a light guide plate having a substantially rectangular planar shape;
a light source for emitting illumination light so that the illumination light enters the light guide plate from a lateral surface of the light guide plate;
a liquid crystal panel, which is arranged on a front side of the light guide plate and is irradiated with the illumination light guided by the light guide plate; and
a support member, which is arranged on a rear side of the light guide plate, for supporting the light guide plate,
wherein the support member comprises a protrusion directed toward the light guide plate and provided at a position of an adjacent side which is adjacent to, of sides of the substantially rectangular planar shape of the light guide plate, a side at which the light source is arranged, and
wherein the light guide plate comprises:
an engaging concave portion, which is a concave portion formed at another lateral surface of the light guide plate on the adjacent side and recessed to an inner side with respect to the adjacent side, for preventing a shift of the light guide plate when the protrusion is inserted therethrough; and
a foreset concave portion having a shallower recess than a recess of the engaging concave portion, and positioned in front of the engaging concave portion when viewed from the light source.

2. The liquid crystal display device according to claim 1, wherein the foreset concave portion comprises a plurality of foreset concave portions arranged in front of the engaging concave portion when viewed from the light source, and
wherein the plurality of foreset concave portions have a shallower recess toward the light source side.

3. The liquid crystal display device according to claim 1, wherein a part of a lateral surface of the light guide plate, which forms the foreset concave portion and into which the illumination light enters, is inclined with respect to an incident direction of the illumination light.

4. The liquid crystal display device according to claim 1, wherein the foreset concave portion has a width larger than a width of the engaging concave portion.

* * * * *